No. 744,099. PATENTED NOV. 17, 1903.
C. A. PETTIE.
VEHICLE TIRE.
APPLICATION FILED OCT. 1, 1901.
NO MODEL.

WITNESSES:
Nathan B. Chadsey
Nathan B. Chadsey

INVENTOR
Charles A. Pettie,
BY J. W. Barker
ATTORNEY

No. 744,099.                                                           Patented November 17, 1903.

UNITED STATES PATENT OFFICE.

CHARLES A. PETTIE, OF BROOKLYN, NEW YORK.

VEHICLE-TIRE.

SPECIFICATION forming part of Letters Patent No. 744,099, dated November 17, 1903.

Application filed October 1, 1901. Serial No. 77,213. (No model.)

*To all whom it may concern:*

Be it known that I, CHARLES A. PETTIE, a citizen of the United States, residing in the borough of Brooklyn, in the county of Kings and State of New York, have invented a new and useful Improvement in Vehicle-Tires, of which the following is a specification.

This invention relates to tires composed of solid rubber and such as are particularly applicable for use upon the wheels of automobiles and other heavy vehicles, where strength and durability are important desiderata.

My improvements comprise, in brief, first, means enabling the rubber tire to be held securely upon the steel rim against lateral displacement; second, means to forcibly prevent creeping or circumferential slipping of the rubber tire; third, means for fabric reinforcement for the rubber tire unifying its structure, while minimizing its liability to chip or peel; fourth, means preventing cracking and splitting at the sides of the rubber tire, where the greatest stretching of material occurs.

Figure 1:
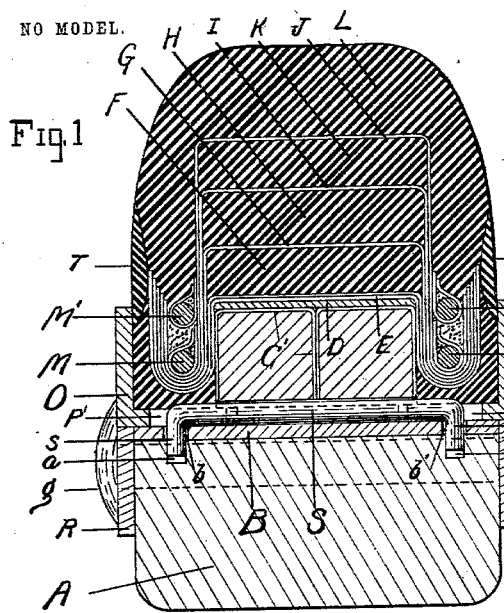
Figure 3:
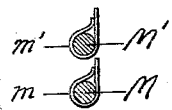
Figure 4:
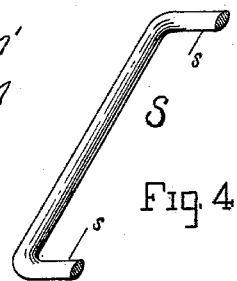
Figure 5:
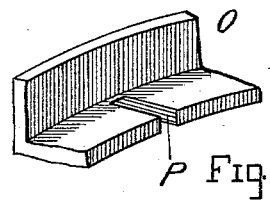
Figure 2:
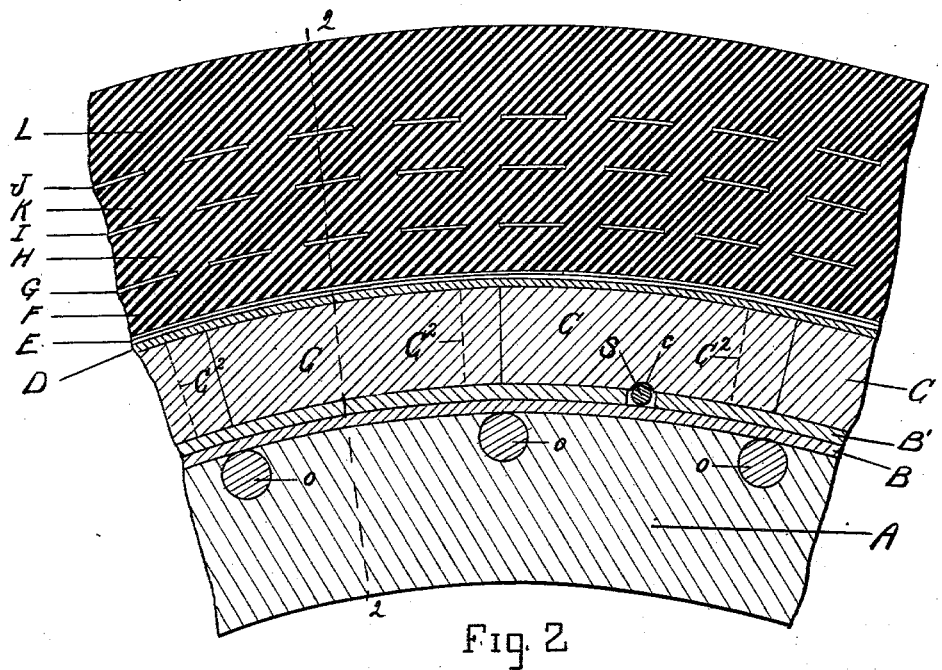

In the drawings accompanying this application, Figure 1 is a cross-sectional view of a tire with felly and steel rim, taken on line 2 2 of Fig. 2. Fig. 2 is a vertical longitudinal sectional view thereof, broken away. Fig. 3 is a detail sectional view of the binding wires or hoops with their wrappings. Fig. 4 is a detail view of the anticreeping yoke employed; and Fig. 5 is a detail partial view of one of the angle-hoops employed, showing the slot.

In said figures, A indicates the ordinary wooden felly, and B the metal tire or rim encircling same. Fitted over metal rim B is an annular metal band B', whose opposed ends are separated to permit the insertion of a lock member, which will be referred to hereinafter. Superposed upon said band B' and extending circumferentially thereabout is what I term a "core" C, the same comprising a series of blocks of wood or other suitable solid material united at their upper surface by a continuous strip of fabric or other flexible material, as D.

Disposed about the outer periphery and at the sides of the core C is a cushion core portion composed of rubber and fabric, the same being united and arranged as follows: One or more plies of fabric in sheet form, as E, serve as a base for a layer of rubber, as F, and a series of fabric bands or straps, as G, extend transversely over layer F and are succeeded by a superposed layer of rubber, as H.

I and J respectively indicate succeeding series of fabric bands or straps, and K and L refer to succeeding layers of rubber, the fabric bands or straps lying intermediate succeeding layers of rubber. The method of building up a tire with layers of rubber in a raw state permits the insertion of the series of bands or straps of fabric in the manner described, and the spaces existing between the said bands or straps in a like plane permit the separate layers of rubber to cohere and form a single homogeneous mass through the process of vulcanization.

An outer facing of rubber, as L, which is built up of two or more layers, extends about the rubber and fabric core portion, its lower edges also embracing the solid core C, as seen. Disposed circumferentially through each of said lower edges of the outer facing are one or a pair of strands or circular hoops, as M M' N N'. Said hoops prior to their insertion within the outer facing of the tire are wrapped with fabric *m* in the manner indicated in Fig. 3. In order to firmly secure said hoops within the material of the said outer facing, the plies and bands or straps of fabric, as E G I J, have their opposite ends passed, respectively, about the opposite hoops or pairs of hoops, as seen, the fabric ends terminating, preferably, in upwardly-stepped manner, as indicated.

Angle-hoops O P, substantially L-shaped in cross-section, are disposed one at each side of the tire, their lower horizontal flanges being seated upon metal rim B, while their vertical flanges embrace the lower edges of the outer facing L.

*o* indicates a bolt, of which a series are employed in a tire, being passed transversely through the felly A and having head *g* and nut *g'* to secure them. Washers R R' upon the bolt flank the felly A and respectively embrace the opposite sides of the felly and metal rim, while the head *g* and nut *g'* of said bolt, respectively, embrace the opposite angle-hoops O P, besides bearing tightly against washers R R'.

The horizontal flanges of angle-hoops O P have opposite slots P' P² formed therein, and holes *b b'* are formed in the metal rim B in alinement therewith, recesses $a$ $a'$ in the felly A being also in registration therewith. In horizontal alinement between the slots $P'$ $P^2$ a groove $c$ is formed in the under side of the solid core C. I provide a yoke lock-piece S, composed of a straight bar or rod having the downwardly-turned ends $s$ $s$, which latter are adapted to enter the holes $b$ $b'$ and $a$ $a'$, while the straight portion of said bar or rod lies between the opposed ends of metal band $B'$ and within the groove $c$ and slots $P'$ $P^2$. By these means the rubber tire is firmly secured upon rim B and prevented from creeping or slipping circumferentially thereon.

The metal band $B'$ may be composed of a series of separate sections spaced apart to permit a number of lock-pieces $s$ to be employed, in such case the metal rim B having additional holes $b$ $b'$, the felly having corresponding recesses $a$ $a'$, while the angle-hoops and core C must be slotted in agreement therewith. While I have found in practice that a single yoke lock-piece S answers the purpose, still, as is obvious, I do not limit myself thereto.

A further feature of invention lies in the employment of a circumferential strip or section of relatively flexible or elastic rubber at each outer side of the tire extending a predetermined distance from a point adjacent to the angle-hoops. Said strip or section of elastic rubber is indicated by the letter T and is intended to obviate the liability of the tire to crack or split at its side at such times as the material of the tire is stretched by reason of the tire getting a side pressure under the load when deflected. Naturally the greatest amount of stretch occurs at the outer surface of the tire, being the point farthest from the point or fulcrum of compression. The point where this stretching occurs, just beyond the channel in the ordinary solid tires and in the case of this special form of tire just beyond the angle-hoops, is perhaps the most vulnerable part of the tire, and tires commonly give out here first, because the material employed has not sufficient elasticity to yield or stretch without cracking. Hence my aforesaid improvement is of considerable importance and will serve to prolong the life of the tire. The strip T of relatively elastic rubber is applied in a raw state in building up the tire and when vulcanized becomes an integral part thereof.

The metal band $B'$ serves the purpose of forming a surface in the plane of the horizontal flanges of the angle-hoops O P whereon to seat the core C, and any slack occurring through wear and stretch of the tire may be taken up by removing said metal band and substituting one of greater thickness. However, said band $B'$ may, if desired, be entirely dispensed with. Likewise the washers R R' are non-essential elements which I employ for the sake of convenience, but whose functions can be performed by the bolt-heads and nuts.

The sections comprising the core C may, if desired, be made in separate parallel strips with a ply of fabric between them, as indicated at $C'$ in Fig. 1. Also the employment of said parallel strips permits me to break joints in fitting the core-sections together, as shown by dotted lines $C^2$ in Fig. 2, thereby affording additional strength.

It will be understood that the number of plies of fabric and the number of layers of rubber used in the construction of the tire is non-essential and should be determined according to the size and strength of the tire required. Likewise I do not wish to be limited to the exact details of construction shown and described.

Having described my invention, I declare that what I claim is—

1. In a vehicle-tire, in combination, a felly, a metal rim thereon, a solid core, a rubber cushion, a plurality of binding bands or straps of fabric passed through said rubber cushion on different planes, to reinforce it, and an outer facing therefor.

2. In a vehicle-tire, in combination, a solid core, a rubber cushion thereabout, an outer facing, binding-wires in said facing adjacent to said solid core, and lateral inclosing angle-hoops; together with series of bands or straps of fabric disposed within the rubber cushion, in different planes, and their opposite ends extending about the binding-wires.

3. In a vehicle-tire, in combination, a felly, having recesses formed therein, a metal rim having corresponding apertures, and a rubber cushion encircling said rim, together with a lock bar or rod having bent ends to engage with said apertures and recesses.

4. In a vehicle-tire, in combination, a felly having recesses formed therein, a metal rim having corresponding apertures, a solid core upon said rim having a series of grooves in its contiguous surface, a rubber cushion, a cover and a pair of angle-hoops flanking the tire, said angle-hoops being slotted and seated upon the metal rim; together with a lock bar or rod adapted to lie within the aforesaid groove and slots, and having turned ends to engage with the aforesaid apertures and recesses.

5. In a vehicle-tire, a solid core, a hoop parallel with and adjacent to each side thereof, a fabric base E extending over said core and encompassing said hoops respectively and a resilient body encompassing said core, said hoops and said base, in combination with means whereby said tire may be attached to a wheel-felly, substantially as described.

6. In a vehicle-tire, a solid core, a hoop parallel with and adjacent to each side thereof, a fabric base E extending over said core and encompassing said hoops respectively, a resilient body surrounding said core, said hoops and said base and a plurality of bands of fabric encompassing said hoops and embracing respectively a portion of said resilient body, in combination with means whereby said tire may be attached to a wheel-felly, substantially as described.

7. In a vehicle-tire, the combination with a resilient body and a solid core having a recess therein, of a metal rim B' and a lock-bar seated in said recess and adapted to engage said rim and the felly of a wheel, angle-hoops, the angles of which respectively form a base for said tire and prevent a lateral displacement thereof, and means whereby said hoops are held against lateral displacement, substantially as described.

8. In a vehicle-tire, the combination with a retaining-flange on each side of a felly of a resilient body seated between, and provided on each side thereof adjacent to, said flanges, with integral, annular strips of material of relatively greater elasticity than said resilient body whereby an initial cracking of the tire adjacent to said flanges is prevented substantially as described.

9. In a vehicle-tire, the combination with a resilient body of angle-hoops on each side thereof, the flanges of which respectively rest upon the periphery of the felly to form a base for said body, and extend outwardly radially of the wheel to prevent lateral displacement of said body, and means adapted to separately flank and engage said felly and said last-mentioned flanges respectively whereby said hoops are held against lateral displacement.

10. In a vehicle-tire, the combination with a resilient body of laterally-adjustable angle-hoops on each side thereof, the flanges of which respectively rest upon the periphery of the felly to form a base for said body, and extend outwardly and radially of the wheel to prevent lateral displacement of said body, and means adapted to separately flank and engage said felly and said last-mentioned flanges respectively whereby said hoops are held against lateral displacement.

In testimony whereof I have signed my name to this specification, in the presence of two subscribing witnesses, this 6th day of September, 1901.

CHARLES A. PETTIE.

Witnesses:
 NATHAN B. CHADSEY, Jr.,
 NATHAN B. CHADSEY.